June 17, 1930.                D. MASSARDO                1,764,217
                           CAR TACKING INDICATOR
                      Filed Oct. 25, 1928        2 Sheets-Sheet 1
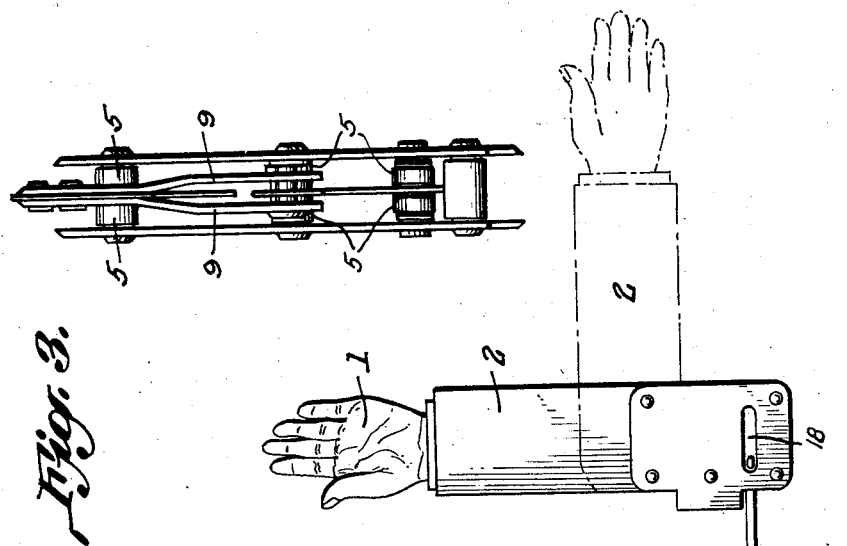
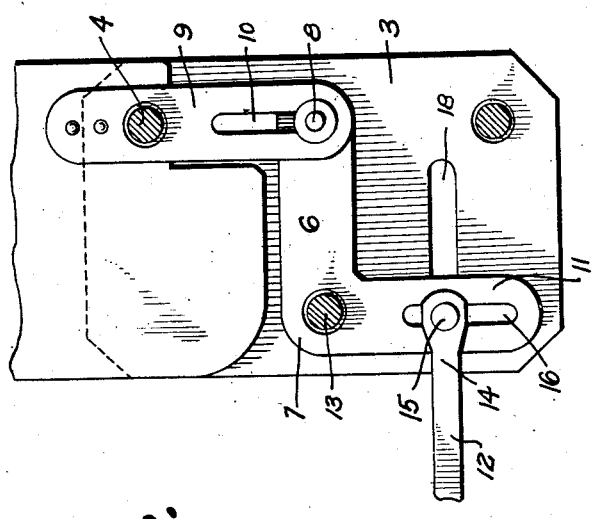
Inventor:
D. Massardo
By: Marlo &Clar
      Attys.

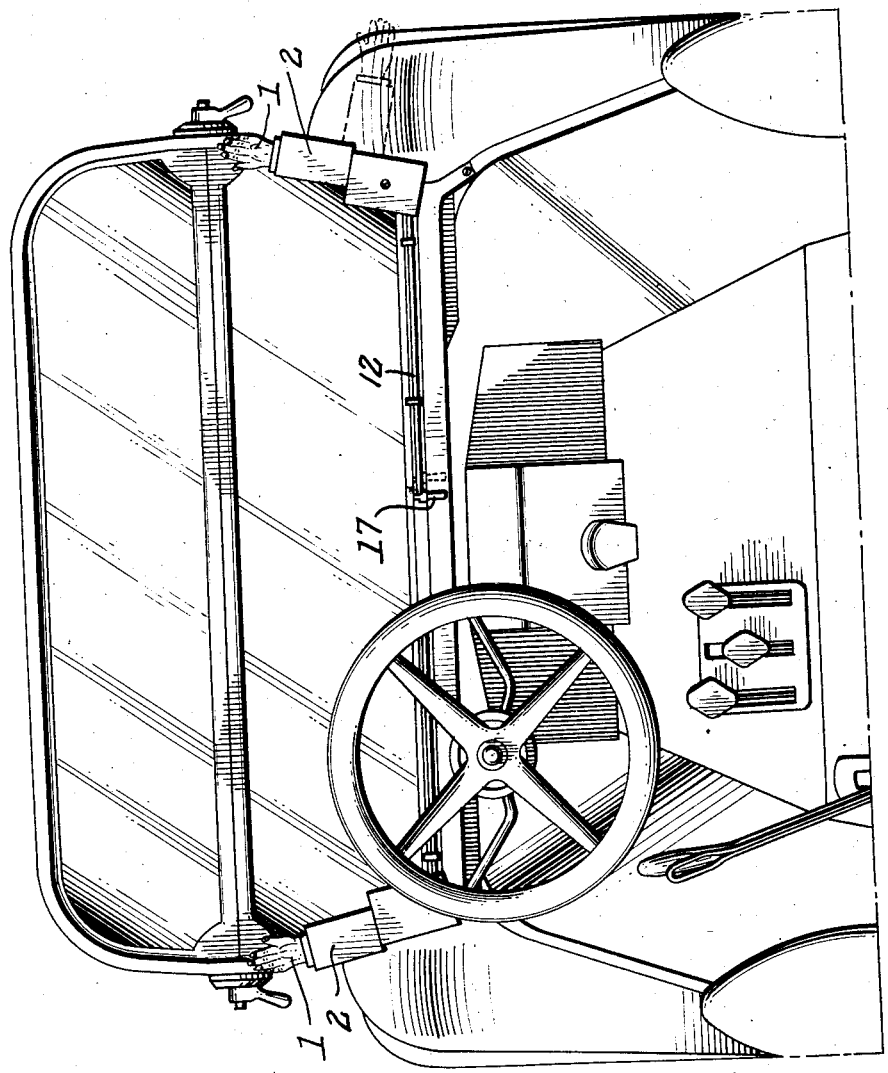

Patented June 17, 1930

1,764,217

UNITED STATES PATENT OFFICE

DOMINGO MASSARDO, OF SANTIAGO, CHILE

CAR-TACKING INDICATOR

Application filed October 25, 1928. Serial No. 315,056.

This invention relates to improvements in indicators for vehicles, and has for its object to provide a device of this character which is capable of convenient operation and which will effectively indicate to vehicles approaching and following the one to which the indicator is applied the intention of the operator of the latter to turn or stop.

A further object of the invention is the provision of an indicator which is efficient in operation and simple and inexpensive to operate, including a minimum number of parts constructed and arranged to positively effect movement of the indicating member.

In the accompanying drawing wherein an approved embodiment of the invention is illustrated, Fig. 1 is a front elevation of the indicator removed from a vehicle;

Fig. 2 is an enlarged detail view of the casing of the indicating member and cooperating parts, the front wall of the casing being removed to show the interior thereof;

Fig. 3 is an enlarged edge elevation of the portion of the indicator represented in Fig. 2; and Fig. 4 is a fragmentary interior view of a motor vehicle showing the invention applied to use.

Referring to the drawing in detail, the numeral 2 indicates an indicating member which is pivotally mounted at 4 between the two walls of a casing 3. The indicating member 2 is preferably provided terminally with the figure of a hand so as to render the indicating member clearly visible and to distinguish it clearly from other moving objects.

The pivot pin 4 supporting the indicating member for swinging movement forms one of several connections between the walls of the casing 3, whereby the walls are maintained in spaced relation to accommodate the indicating member and certain other parts of the indicator. Annular members 5 are arranged between the walls of the casing 3 and the member 2 to maintain the latter in a position centrally disposed within the casing.

An angular lever 7 is pivotally mounted at 13 in the casing 3, and one of its arms 6 is provided with a pin 8 engaging a slot 10 provided in an arm 9 fixed to the indicating member 2 whereby the latter is caused to swing about its pivotal axis 4 incident to turning movement of the lever 7.

The opposite arm 11 of the angular lever 7 is provided with a slot 16 accommodating a pin 15 secured to the end 14 of an actuating rod 12. The opposite side walls of the casing 3 are slotted as at 18 to accommodate the extremities of the pin 15 whereby the latter, together with the actuating rod 12, are guided during movement of said rod.

The end of the rod 12 opposite the casing 3 is provided with a handle 17 and in the application of the indicator to a motor vehicle, as shown in Fig. 4, the casing 3 is arranged in such position as to mount the indicating member in position for movement within full view of persons in the vicinity of the vehicle, while the rod 12 is extended to a point where the handle 17 may be conveniently grasped and moved by the vehicle operator. As suggested in Fig. 4, two of the indicators may be applied to the vehicle, one at either side thereof. It will be understood that a simple movement of the rod 12 longitudinally will effect swinging movement of the indicating member 2, movement being imparted to the latter from the rod 12 through the angular lever 7 and the arm 9, and the movement of the guide rod 12 being guided by engagement of the pin 15 in the slot 18.

I claim:

A vehicle indicator including a casing, an indicating member pivotally mounted therein, a slotted arm integrally secured to said indicating member, an angular lever pivoted in said casing and having a pin engaging in the slot in the arm, the extremity of the lever opposite said arm having a slot therein, and an actuating rod for the indicating member having one terminal engaged in the slot in said lever, said casing having a slot therein guiding the end of the actuating rod and connected with said lever causing said rod to move in a direction parallel to said axis.

In testimony whereof I affix my signature.

DOMINGO MASSARDO.